Aug. 4, 1959

H. B. PLUMB 2,898,127

CAM LOCK TRACTOR HITCH

Filed July 22, 1957

H. B. PLUMB INVENTOR.

BY Arthur H. Sturges
Attorney

Aug. 4, 1959 H. B. PLUMB 2,898,127
CAM LOCK TRACTOR HITCH
Filed July 22, 1957 2 Sheets-Sheet 2

H. B. PLUMB INVENTOR.

BY *Arthur A. Sturges*
   *Attorney*

2,898,127

CAM LOCK TRACTOR HITCH

Harold B. Plumb, Harlan, Iowa

Application July 22, 1957, Serial No. 673,308

2 Claims. (Cl. 280—478)

This invention relates to hitches particularly of the type used for attaching tractors to farm implements, and in particular a pair of vertically spaced bars, or a channel bar having vertically spaced flanges extended from a web with a cam pivotally mounted in the upper bar or flange and positioned to coact with a longitudinally or transversely disposed draw-bar of a tractor whereby lateral movement between the parts is provided so that it is not necessary for the operator of a tractor to back the tractor to an exact position in connecting the tractor to an implement.

The purpose of this invention is to facilitate attaching tractors to farm implements by providing flexibility or lateral movement in the hitch elements to obviate the necessity of backing the tractor to an exact position.

In numerous instances, in connecting a tractor to a farm implement, it is necessary to back the tractor to a hitching position in front of an implement several times before having the openings in the draw-bar positioned to receive a bolt of a hitch of an implement, and each time the tractor is operated it is necessary for the operator to climb down from the seat on the tractor and endeavor to bring the parts into registering relation. By this means considerable time is lost, and, consequently, making a connection in this manner is costly.

With this thought in mind this invention contempletes a hitch having a connecting element with a cam therein wherein with the element pivotally connected to a draw-bar of a tractor tension on the hitch swings the element around with the cam passing over the draw-bar and dropping into a locking position whereby the point of connection to the implement is variable.

The object of this invention is, therefore, to provide a hitch element formed to be used between the hitch of an implement and a draw-bar of a tractor or the like wherein the necessity of aligning an opening in the draw-bar of a tractor with a hitch of an implement is obviated.

Another object of the invention is to provide a hitch assembly in which a cam locking element is used on both a transversely disposed and also on a longitudinally disposed draw-bar.

Another important object of the invention is to provide a draw-bar connection in which the necessity of aligning an opening in a draw-bar of a tractor with a hitch of an implement is obviated wherein the connection may be used for attaching various types of implements to a tractor.

It is yet another object of the invention to provide a hitch connector for attaching tractors to farm implements without exactly aligning the tractor with the implement in which the device is designed to be used on tractors and implements now in use without changing parts thereof.

A further object of the invention is to provide a flexible connection for attaching tractors to farm implements in which the device is readily disconnected after use.

A still further object is to provide a hitch connector for attaching tractors to farm implements without exactly aligning the tractor with the implement being connected thereto in which the connector is of a simple and economical construction.

With these and other objects and advantages in view the invention embodies a pair of vertically spaced bars or a channel bar having vertically spaced flanges with a cam having a flat side pivotally mounted on the upper bar or flange, and with bolt holes in extended ends whereby with the device secured by a bolt to a transversely or longitudinally disposed tractor draw-bar forward movement of the tractor swings the connector around with the cam dropping over an edge of the draw-bar and thereby locking the implement to which the bars or flanges are connected to the draw-bar of the tractor.

Other features and advantages of the invention will appear from the following description taken in connection with the drawings, wherein.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

Figure 4:
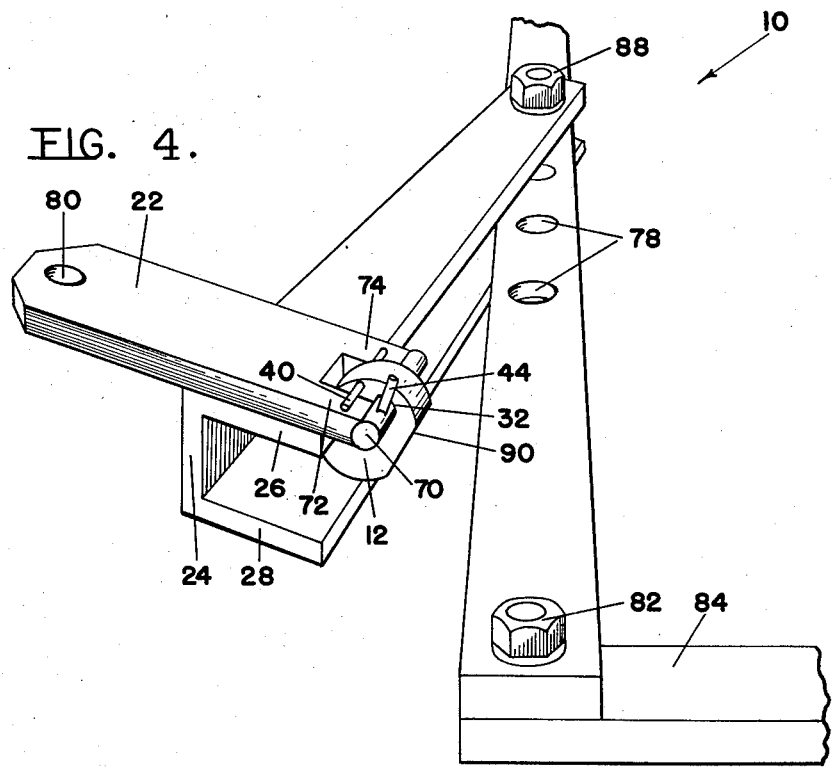
Figure 4 is a plan view showing a modification wherein the cam element of the connector shown in Figures 1 to 3 is mounted on a flange of a channel bar and wherein the flanges of the channel bar are pivotally connected by a bolt to a horizontally disposed draw-bar of a tractor.
Figures 5, 6:
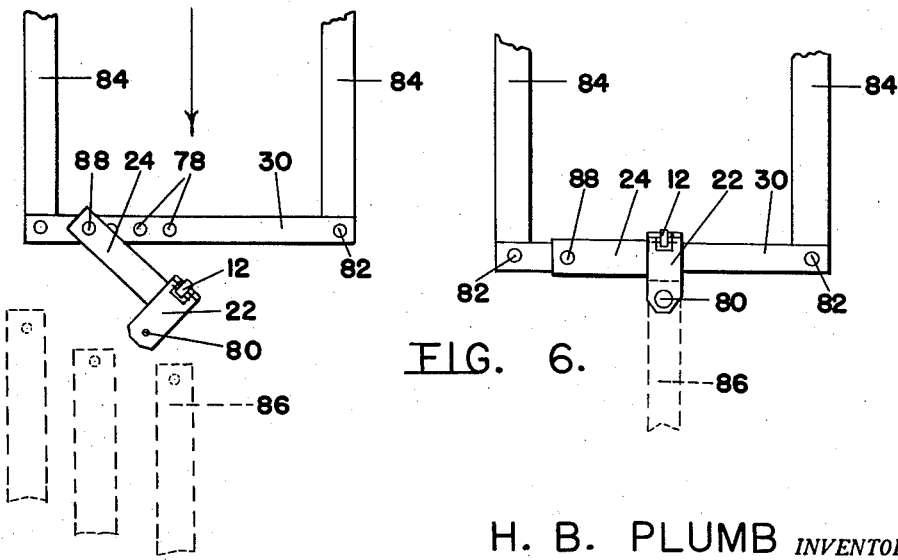
Figure 5 is a plan view of the assembly shown in Figure 4 showing the hitch connector in position for attaching a tractor to a hitch of an implement, the hitch of the implement being shown in a plurality of positions in broken lines.
Figure 6 is a plan view of the hitch assembly shown in Figures 4 and 5 with the parts in the locked position, and with the hitch of the implement shown in broken lines.

In the accompanying drawings, and in the following specification, the same reference characters are used to designate the same parts and elements throughout, and in which the numeral 10 refers to the invention in its entirety, numeral 12 indicating a cam pivotally mounted in an extended end of a plate 14 carried by vertically spaced bars 16 and 18 in the design used in combination with longitudinally disposed draw-bars, as indicated by the numeral 20; and pivotally mounted in the end of a bar 22 carried by a channel bar 24 having vertically spaced flanges 26 and 28 in the design used for transversely disposed draw-bars, as indicated by the numeral 30, and as illustrated in Figures 4, 5 and 6.

Figure 1:
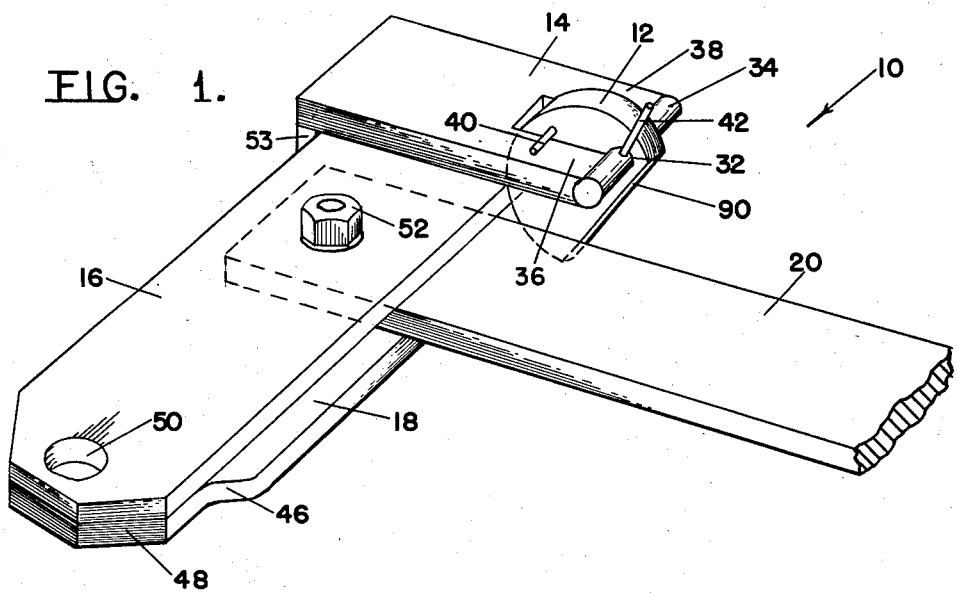
Figure 1 is a perspective view showing the improved hitch connector pivotally mounted on the end of a longitudinally positioned draw-bar and with the parts in the free position.

The cam 12 is provided with an eccentrically positioned opening 32, and in the design shown in Figure 1, the cam is rotatably mounted on a pin 34, the ends of which are secured, such as by welding, to the ends of arms 36 and 38 of the bifurcated end of the bar or plate 14. The cam is provided with a pin 40 that extends at a right angle an equal distance on both sides thereof, and the pin is positioned to engage the upper surface of the arm 36 of the plate 14 to limit rotation of the cam in a counterclockwise direction with the parts as shown in Figure 1. The pin 40 is also positioned to engage a stationary pin 42 extended upwardly from the pin 34 to limit rotation of the cam in a clockwise direction with the parts as shown in Figure 1, and to engage a stationary pin 44, similar to the pin 42, with the parts as shown in Figure 4.

In the design shown in Figures 1, 2 and 3, the plate 14 is secured, such as by welding, to the upper bar 16, and the lower bar 18 is provided with an offset portion 46, providing a section 48 that is secured to the end of the bar 16 by a fastener, or such as by welding whereby the intermediate portion of the bar is spaced below the bar 16 a sufficient distance to straddle the draw-bar 20. The bars are provided with openings that are positioned to register with one of several openings in the draw-bar so that the connector may be retained on the draw-bar with a bolt, such as the bolt 52.

Figure 2:
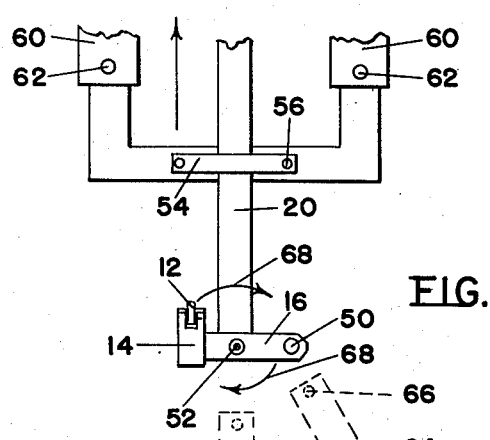
Figure 2 is a plan view of the connector with the parts as shown in Figure 1, and showing a hitch of an implement in different positions in broken lines.
Figure 3:
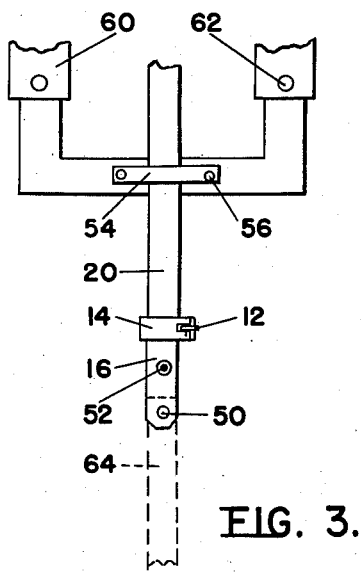
Figure 3 is a plan view of the hitch assembly showing the hitch of an implement secured to a longitudinally disposed draw-bar of a tractor, the hitch being shown in broken lines.
Figure 7:
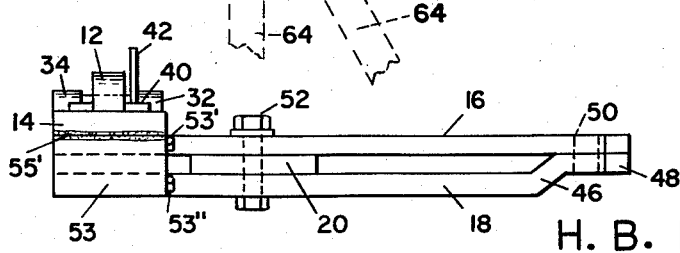
Figure 7 is a side view of the hitch connector of Figures 1, 2 and 3.

It will be seen that the member 14 overlaps that side of the bar 16 which is opposite the cam 12, as best seen in Figures 1, 2 and 3. Below this overlapping portion of the member 14 is a vertical stop member 53 which latter is welded or otherwise suitably attached to the bottom of the overlapping member 14 at 55'. The vertical stop member 53 is also welded as at 53' to the upper bar 16 and the stop member 53. The stop member 53 extends downwardly to and is otherwise suitably secured to the adjacent edge of the member 18, as seen at welding 53''.

It will be also seen that, as mentioned in the objects hereof, a channel bar can be used in place of the members 16, 18 and 53 in the manner of the channel bar 24 of Figure 4. It is the intention that Figures 1 to 3 show that members 16, 18 and 53 are one way of accomplishing the same thing attained by the channel bar of Figure 4.

In the design shown, the draw-bar 20 extends through a bracket 54 that is mounted by bolts 56 on a support 58 and the support is attached to frame members 60 of a tractor by bolts 62.

With the bars 16 and 18 positioned as shown in Figure 2, the tractor is backed to a hitch of an implement with the hitch in any of several positions, as indicated by the broken lines 64, and the connector is attached to the hitch with a bolt extended through the opening 50 in the ends of the bars and also through an opening 66 in the hitch. Upon moving the tractor forward the pull of the implement swings the connector around in a clockwise direction, as indicated by the arrows 68, until the cam snaps over the draw-bar, locking the parts in operative positions, as shown in Figure 3. This locking is between the vertical stop member 53 and the cam 12 when the modification of Figures 1, 2 and 3 is used and is between the cam 12 and the vertical part 24 of a channel when a channel is used.

In the design shown in Figures 4, 5 and 6, the cam is rotatably mounted on a pin 70 secured to the ends of arms 72 and 74 of the bifurcated end of the bar or plate 22 which is secured, such as by welding, to the upper flange 26 of the channel bar 24. A stationary pin 44 is mounted on the pin 70 to provide a stop to limit the rotary motion of the cam, the pin 44 being positioned to be engaged by the pin 40 extended from the side of the cam. The extended ends of the flanges 26 and 28 of the channel bar 24 are provided with openings positioned to register with spaced openings 78 of the draw-bar 30. The draw-bar 30 is secured by bolts 82 to arms 84 extended from a tractor, and the plate 22 is provided with an opening 80 by which the connector is attached to the hitch of an implement.

In use a tractor is backed to a position adjacent the hitch of an implement, the hitch being in any number of positions, as indicated by the broken lines 86 in Figure 5, and with the flanges of the channel bar 24 straddling the draw-bar 30 a bolt 88 is placed through openings in the flanges 26 and 28 and also through one of the openings 78 of the draw-bar, and upon continued rearward movement of the tractor the cam swings over the draw-bar dropping to a locked position on the forward side of the bar as shown in Figure 6. A draw-bar pin may then be inserted through the aperture 80, connecting implement 86 to tractor.

The hitch connector may readily be disconnected by removing the bolt 52 of the design shown in Figure 1, or the bolt 88 of the design shown in Figure 4, and with the bolt removed the flat side 90 of the cam is positioned to slide over the draw-bar permitting the connector to be removed from the draw-bar. The movement of the cam is controlled or limited by the pin 40 which contacts the upper surface of the plate in which the cam is mounted upon rotation of the cam in an anti-clockwise direction, and which contacts one of the pins 42 or 76 upon rotation thereof in a clockwise direction.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and arrangement of details and parts such as come within the purview of the invention claimed may be resorted to in actual practice, if desired.

Having now described the invention that which is claimed to be new and desired to be procured by Letters Patent is:

1. In a connector for a hitch, the combination which comprises a pair of bars, one of said bars being offset downwardly providing space for a draw-bar of a tractor between the bars, means for pivotally mounting the bars on the draw-bar of the tractor, a plate having a bifurcated end providing spaced arms mounted on the uppermost of said bars, a shaft mounted on the ends of the arms, a cam rotatably mounted in an eccentric position on said shaft, said cam being positioned to drop over a draw-bar on which the pair of bars is pivotally mounted, a pin extended from one side of the cam and positioned to engage one of said arms for limiting rotary movement of the cam in one direction, and a pin extended from said shaft and positioned to be engaged by the pin of the cam for limiting rotary movement of the cam in the opposite direction.

2. In a hitch connector, the combination which comprises a channel bar having a web with flanges extended from edges thereof, a plate mounted on the uppermost of said flanges and extended from both sides of the channel bar, one end of the plate having an opening therein and the opposite end being bifurcated and having spaced arms extended therefrom, a shaft mounted on ends of the arms, a pin extended from the shaft, a cam having a flat side and having an opening eccentrically positioned therein, the said shaft extending through the opening of the cam providing means for rotatably mounting the cam between the arms, and a pin extended from the cam and positioned to, selectively, engage one of said arms to stop rotation of the cam in one direction or engage the pin extended from the shaft to stop rotation of the cam in the opposite direction, the ends of the flanges of the channel bar opposite to the end of the bar on which the cam is positioned having openings therethrough for attaching the connector to the draw-bar of a tractor.

References Cited in the file of this patent
UNITED STATES PATENTS

| | | |
|---|---|---|
| 1,574,351 | Altgelt | Feb. 23, 1926 |
| 2,678,222 | Payzant | May 11, 1954 |
| 2,692,150 | Maier | Oct. 19, 1954 |
| 2,717,164 | Meyer | Sept. 6, 1955 |